June 15, 1937.  L. W. VINAL  2,083,676

FLOATING DIE HEAD FOR MOLDING PRESSES

Filed Oct. 23, 1933  2 Sheets-Sheet 1

Inventor
Leroy W. Vinal
By Attorneys

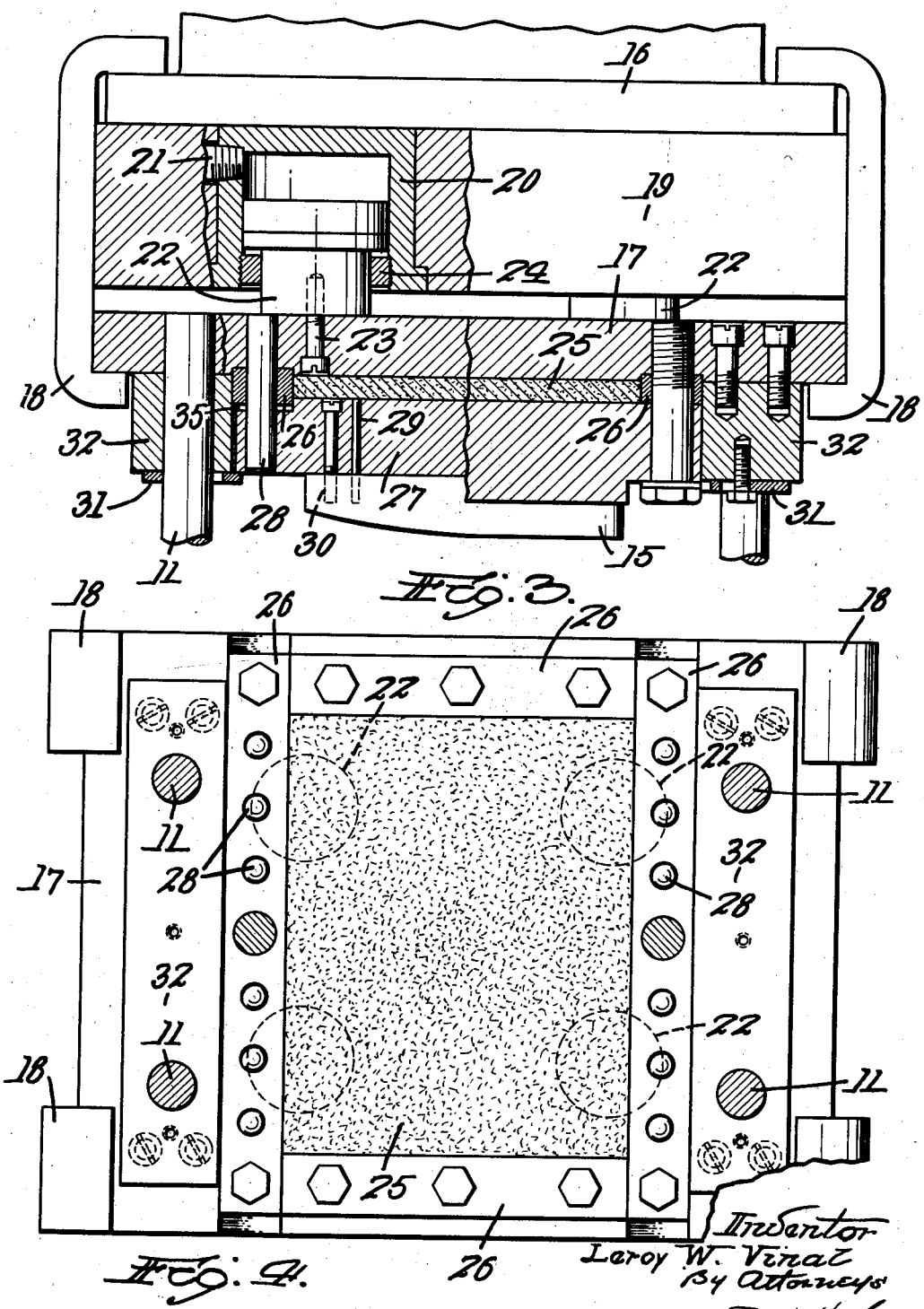

Patented June 15, 1937

2,083,676

UNITED STATES PATENT OFFICE 2,083,676

FLOATING DIE HEAD FOR MOLDING PRESSES

Leroy W. Vinal, Leominster, Mass., assignor, by mesne assignments, to E. I. du Pont de Nemours & Company, Wilmington, Del., a corporation of Delaware Application October 23, 1933, Serial No. 694,807

6 Claims. (Cl. 18—16)

This invention relates to a die head for supporting the dies for pressing and cutting pyroxylin, or other plastic material, pressed against the die head by a plunger.

The principal objects of the invention are to provide a series of dies, each under independent fluid pressure but with the pressure equal for all of them so that, when the plungers are brought against the dies, each of them can yield independently under the pressure on the plungers to a slight extent; to provide a cushion, common to all the dies and plungers, of soft rubber or similar material confined within a space, so as to allow each die to yield independently to accommodate a thicker piece of stock in one of them than in others, and to provide this means for the purpose of permitting those dies in which a thick piece of stock has been placed to mold their material accurately without effecting in accurate molding of the normal pieces of stock in other dies. This is done with a minimum of additional mechanism and saves a great amount of stock because in the past a thick piece under one die of a series would prevent the molding accurately of normal pieces under the other dies.

Other objects and advantages of the invention will appear hereinafter.

Reference is to be had to the accompanying drawings, in which

Fig. 3 is a sectional view of the dies on the broken line 3—3 of Fig. 2, and

Fig. 4 is a bottom plan view of the cushion and surrounding parts, as shown in Fig. 3.

Figure 1:
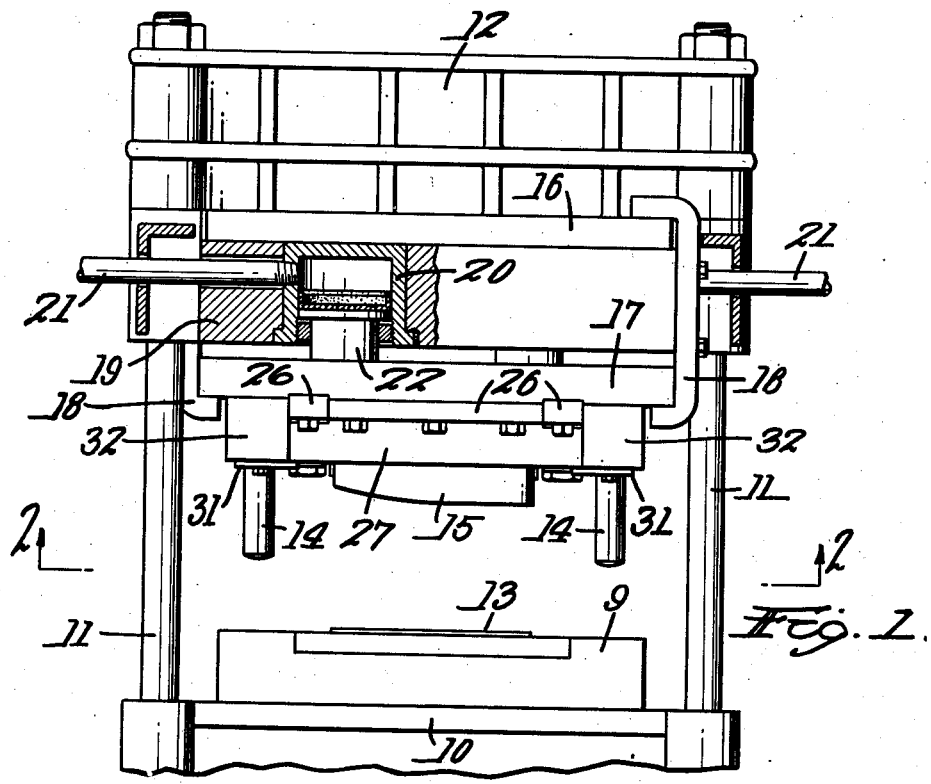
Fig. 1 is a front elevation of a part of a die press constructed for the purpose of molding sheets of pyroxylin or similar plastic material and embodying the principles of this invention.
Figure 2:
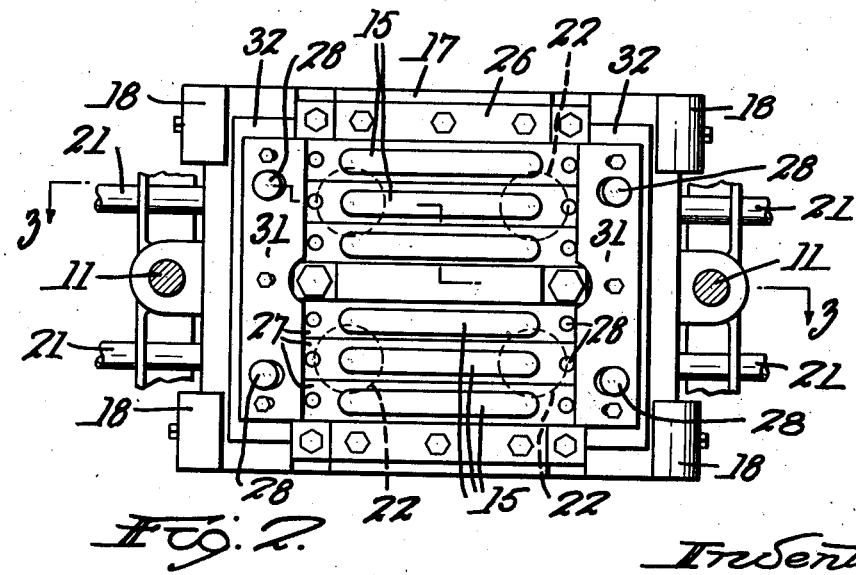
Fig. 2 is a sectional view on the line 2—2 of Fig. 1 looking upward, consequently constituting a bottom plan view of the die.

This invention relates to a type of mold for pyroxylin and other sheet plastic materials embodying a series or gang of dies. Heretofore, in this type of molding, if a thick piece of pyroxylin or the like were put in one die it would prevent the other dies from receiving sufficient pressure to properly mold the sheets placed in them. The consequence would be a loss of the whole operation or the throwing away of a large amount of waste as only one of the sheets would be molded properly. Likewise, if a thin sheet were placed in one of the dies it would not be molded properly. The invention is designed largely to obviate this difficulty.

The device is shown in a form in which a plunger 10 is mounted to reciprocate vertically on a pair of vertical rods 11 which support a rigid head 12 above. This plunger is operated upwardly by toggles, or in any other desired way, to force upwardly the bed 9 carrying a plurality of sheets or blanks 13 of pyroxylin or other sheet material. The plunger is forced upwardly until dowels 14 enter openings in the bed 9 and then until the blanks of sheet material 13 engage a gang of dies 15 and perform the molding operation.

It will be understood that the power for the molding operation comes from mechanism below, which is not shown as it is very common in this art. The head 12 is rigid and solid and stationary as has been the case heretofore but the dies 15 are not rigidly supported by it as has been the case sometimes.

The bottom of this head is flanged to form a plate 16 and carried at some distance below it is a plate 17 which is movable. Clamps 18 are employed to hold the bottom plate 17 from descending too far and getting out of operative condition. On the bottom of the plate 16 is a block 19 in which are located a series of cylinders 20. Four of these are indicated in Fig. 4 for six dies. Each cylinder is connected through a pipe 21 with a single source of fluid pressure, as for example, water pressure. Therefore, the pressure is the same in all of the cylinders. Each one is provided with a plunger 22 and these plungers are designed to have an influence on all the dies 15. They bear on the plate 17 and insure that the pressure behind this plate will be the same on both ends of each die and both sides of the series of dies. The plungers are secured to this plate by screws 23 or the like. The plungers are held in the cylinders by a ring 24 in each case screwing into the lower end of the cylinder.

Underneath this plate 17 is a soft rubber cushion 25, which is surrounded by end and side bars 26 firmly screwed to the plate 17. On the bottom is a series of die plates 27, each of which carries one of the six dies 15 as shown in these drawings. Guide dowels 28 and 29 are shown and screws 30 for holding the dies 15 on the die plates 27. A pair of thin end plates 31 are shown secured to a pair of end spacer blocks 32 which in turn are secured to the plate 17. These end plates 31 hold the die plates 27 up against the rubber cushion 25. A space 35 between the die plates 27 and the side bars 26 allows each die plate 27 to yield in accommodating different thicknesses of blanks 13 to be molded or pressed. These end plates 31 may be moved sideways to allow the interchanging of die plates 27 with dies 15 for other dies. The dies 15 with their independent die plates 27 are independently movable vertically.

In the use of the dies the plunger 10 rises toward the head 12 and the celluloid, pyroxylin, rubber, or other materials, is carried up against the dies 15. These dies are all equally pressed above by the hydraulic pressure in the cylinders 20, as stated. This is merely a resisting pressure against that exerted by the mechanism below. Each one of them is capable of yielding to a slight degree independently of the others on account of the fact that all the die plates 27 abut against the bottom of the yielding rubber cushion 25. A slight difference in the thickness of the sheet material which is to be molded in this machine under the different dies is accommodated by this cushion therefore. If there is a difference in these thicknesses the cushion will yield enough to permit and force the machine to mold all the pieces to substantially the same degree.

The cushion 25, it will be noticed, is confined by metal on all sides so that a thick piece of pyroxylin forcing one of the die plates 27 up slightly will cause the extra pressure to be transmitted through the confined rubber to the rest of them at a slightly lower level. In this way all the blanks 13 will be properly molded. The necessity of throwing away all, or nearly all, of them into the waste or else going to the trouble of manually replacing them for remolding is avoided.

Although I have illustrated and described only one form of the invention I am aware of the fact that modifications can be made therein by any person skilled in the art without departing from the scope of the invention as expressed in the claims. Therefore, I do not wish to be limited in this respect otherwise than as set forth in the claims, but what I do claim is:—

1. In a die press, the combination with a plunger and a stationary rigid head, of a plurality of cylinders carried by said head, means for introducing fluid pressure of the same intensity into said cylinders, a plunger in each cylinder, a plate against which all of said plungers bear with equal pressure, a cushion beyond said plate capable of yielding slightly at any point, and a series of dies abutting against the other side of the cushion for transmitting thereto the pressure from the first named plunger.

2. In a die press, the combination with a plunger and a stationary rigid head, of a block carried by the head, a plurality of cylinders in said block, means for introducing fluid pressure into said cylinders of the same degree in each one at all times, a plunger in each cylinder, a plate against which all of said plungers bear with equal pressure, a cushion under said plate capable of yielding slightly, and a series of dies abutting against the other side of the cushion for transmitting thereto the pressure from the first named plunger.

3. In a die press for the purpose described, the combination of an upwardly moving plunger for performing a molding operation, a stationary rigid head above it, a block carried by the said head, a series of cylinders in said block, means for introducing fluid pressure of the same degree into all of said cylinders, a plunger for each cylinder projecting downwardly out of the block, a plate against which all the said plungers bear, means for supporting a plurality of dies below the plate, a continuous soft rubber cushion between the dies and plate, a plate above the block, and clamps for resting on the upper plate for holding the lower plate in position.

4. In a die press for the purpose described, the combination of an upwardly moving plunger for performing a molding operation, a stationary rigid head above it, a block carried by the said head, a series of cylinders in said block, means for introducing fluid pressure of the same degree into all of said cylinders, a plunger for each cylinder projecting downwardly out of the block, a plate against which all the said plungers bear, means for supporting a plurality of dies below the plate, each restrictedly but independently movable, and a plate above the block.

5. In a die press, the combination with a plunger and a stationary rigid head, of a plate, a plurality of die plates carried by said head, means for applying uniform pressure to the plate at a plurality of points, a cushion beyond said plate capable of yielding slightly at any point, and a series of dies abutting against the other side of the cushion for transmitting thereto the pressure from said pressure applying means.

6. In a press for molding plastic sheet material, the combination of a series of dies, means for maintaining each die under independent fluid pressure, the pressure being equal for all of them, a series of plungers, one for each die, and means whereby each die can yield slightly independently under the pressure of the plungers, in case the stock to be molded is of different thickness in the different dies.

LEROY W. VINAL.